US012643666B2

(12) United States Patent
Kash et al.

(10) Patent No.: US 12,643,666 B2
(45) Date of Patent: Jun. 2, 2026

(54) HEADREST WITH INDEPENDENTLY ADJUSTABLE ARMS AND FLEXIBLE CUSHION

(71) Applicant: B/E Aerospace, Inc., Winston-Salem, NC (US)

(72) Inventors: James S. Kash, Winston-Salem, NC (US); Kathryn Elizabeth Doyle, Chinnor (GB); Lawrie Bellwood, London (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 287 days.

(21) Appl. No.: 18/381,428

(22) Filed: Oct. 18, 2023

(65) Prior Publication Data

US 2025/0128819 A1      Apr. 24, 2025

(51) Int. Cl.
  B64D 11/06          (2006.01)
(52) U.S. Cl.
  CPC ................................. B64D 11/0642 (2014.12)
(58) Field of Classification Search
  CPC ................................................ B64D 11/0642
  USPC ........................................................ 297/406
  See application file for complete search history.

(56) References Cited

U.S. PATENT DOCUMENTS 6,250,716 B1     6/2001  Clough
7,093,903 B2     8/2006  O'Connor et al.

7,264,313 B2 *   9/2007  Clough .................. B60N 2/885
                                                        297/406
10,202,196 B2    2/2019  Hontz et al.
10,315,773 B1    6/2019  Ahad
10,793,040 B2    10/2020 Line et al.
2004/0007910 A1  1/2004  Skelly
2012/0292973 A1  11/2012 Westerink et al.
2016/0023767 A1  1/2016  Zheng et al.
2019/0224034 A1  7/2019  Mersmann
2022/0063466 A1  3/2022  İlker

FOREIGN PATENT DOCUMENTS

EP           3822167 A1     5/2021

OTHER PUBLICATIONS

European Search Report received in EP Application No. 24207596.8, Mar. 11, 2025, 8 pages.

* cited by examiner

*Primary Examiner* — Anthony D Barfield
(74) *Attorney, Agent, or Firm* — Suiter Swantz IP

(57)          ABSTRACT

An adjustable headrest for a seat such as an aircraft passenger seat. In embodiments, the headrest includes an adjustment subassembly including a plurality of independently adjustable support arms. Each support arm includes at least one articulating segment. A cushion subassembly is mounted to the adjustment subassembly by way of slidable couplings to prevent puckering in the cushion subassembly when the lateral arms are adjusted forward. In embodiments, the lateral arms are grouped into upper and lower pairs of lateral arms wherein the lateral arms in the lower pair have a longer length as compared to the lateral arms in the upper pair to support the cheek and jaw of a user.

17 Claims, 12 Drawing Sheets

HEADREST WITH INDEPENDENTLY ADJUSTABLE ARMS AND FLEXIBLE CUSHION

TECHNICAL FIELD AND BACKGROUND

The present disclosure relates generally to an adjustable headrest, and more particularly, to a headrest assembly including an adjustment subassembly providing a highly configurable support provision for the sides of the head.

Seats such as aircraft passenger seats are designed for safety and comfort. Safety typically pertains to the seat frame construction and material performance, while comfort typically pertains to the seat adjustability, ergonomics, cushioning, and climatization.

Headrests are one example of a seat element that provides both comfort and support. For example, a seat may include a separate headrest that serves to center the head with respect to the backrest, provide additional cushioning, and in some cases include a provision for sleeping. While some headrests may be adjustable depending on the user and user preference, adjustability is typically limited to height and/or tilt. In addition, conventional headrests are not able to achieve a 'cupping' shape considering fixed attachments of the cushion to the underlying support structure.

Therefore, what is needed is a headrest with a provision of support that is more configurable to the side of the head, as well as providing an enveloping experience for the user.

BRIEF SUMMARY

In one aspect, embodiments of the inventive concepts disclosed herein are directed to a headrest assembly including a fixed base mountable to a seat, an adjustment subassembly, and a cushion subassembly slidably coupled to the adjustment assembly. In embodiments, the adjustment subassembly includes an adjustable base movably mounted to the fixed base configured for up and down adjustment, and a plurality of lateral arms extending from the adjustable base, each arm including a segment rotatably connected to the adjustable base, and each lateral arm configured for independent forward and back adjustment. In embodiments, the cushion assembly includes a flexible cushion, and a plurality of supports slidably coupling the flexible cushion to the adjustment subassembly, each support having one end slidably engaging one of the segments.

In some embodiments, the cushion subassembly further includes additional supports each having one end slidably engaging the adjustable base.

In some embodiments, the adjustment subassembly includes four lateral arms.

In some embodiments, two of the four lateral arms extend laterally from a left side of the adjustable base, two of the four lateral arms extend laterally from a right side of the adjustable base, and the four lateral arms are symmetrical about a vertical line drawn through the adjustable base.

In some embodiments, two of the four lateral arms extend laterally from a left side of the adjustable base, two of the four lateral arms extend laterally from a right side of the adjustable base, and the four lateral arms are asymmetrical about a horizontal line drawn through the adjustable base.

In some embodiments, the four lateral arms are grouped into an upper pair of lateral arms and a lower pair of lateral arms, the upper pair of lateral arms are aligned along a substantially horizontal axis, and the lower pair of lateral arms are angled relative to the substantially horizontal axis.

In some embodiments, two of the four lateral arms, one positioned on each side of the adjustable base, each include an additional segment rotatably attached to their respective segment, and the support associated with each of the two of the four lateral arms slidably engages the additional segment.

In some embodiments, the lateral arms including the additional segment are longer than the lateral arms without the additional segment.

In some embodiments, the four lateral arms are arranged to form an X-shape.

In some embodiments, each of the lateral arms is independently adjustable between a stowed position substantially aligned with a curvature of the adjustable base, and a deployed position forward of and angled relative to the curvature of the adjustable base.

In some embodiments, the cushion subassembly includes relief cuts in the flexible cushion positioned proximal to the rotatable connections of the segments.

In some embodiments, the adjustment subassembly has a larger radius and lower curvature when the plurality of lateral arms are stowed as compared to when the plurality of lateral arms are deployed forward.

According to another aspect, embodiments of the inventive concepts disclosed herein are directed to an aircraft passenger seat including a backrest and a headrest assembly as provided above.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
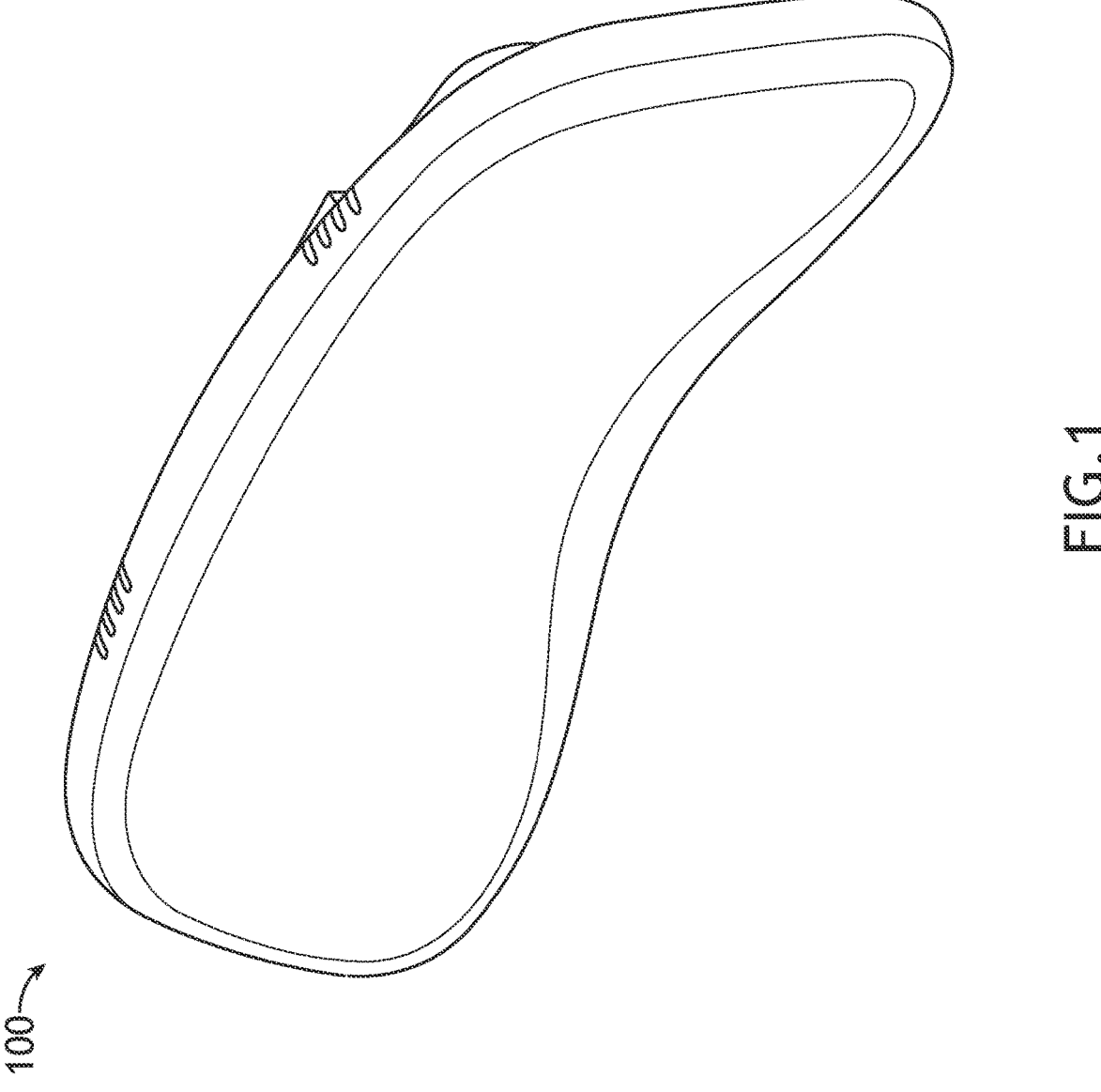
FIG. 1 is a front perspective view of a headrest assembly, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a highly adjustable headrest assembly.

In use, the headrest may be adjusted up and down, as well as portions of the headrest are adjustable forward and back. Portions of the headrest are independently adjustable to maximize configurability for the user. The cushion component of the headrest is slidably coupled to the adjustment component of the headrest to facilitate maximum cushion shape change without resistance and puckering in the flexible cushion component. In a non-limiting application, the headrest assembly may be utilized on an aircraft passenger seat to facilitate greater comfort on long range and premium sectors through the provision of support that is more configurable to the side of the head and provides an enveloping experience for the user.

FIGS. 1-8 illustrate various perspective, front, back, top, side, etc. views of the headrest assembly 100 according to embodiments of the present disclosure. The headrest assembly 100 generally includes a fixed base 102 for mounting to a seat, an adjustment subassembly 104 movably coupled to the fixed base 102, and a cushion subassembly 106 slidably coupled to the adjustment subassembly 104. In use, the adjustment subassembly 104 interacts with the fixed base 102 to change the vertical position of the headrest, and the adjustment subassembly 104 interacts with the cushion subassembly 106 to change the shape of the attached cushion. In embodiments, the adjustment capability of the headrest up and down is separate from the adjustment capability of the headrest forward and back. As such, various combinations of adjustments can be used to configure the headrest assembly according to the physical dimensions and/or preference of the user.

Figure 2:
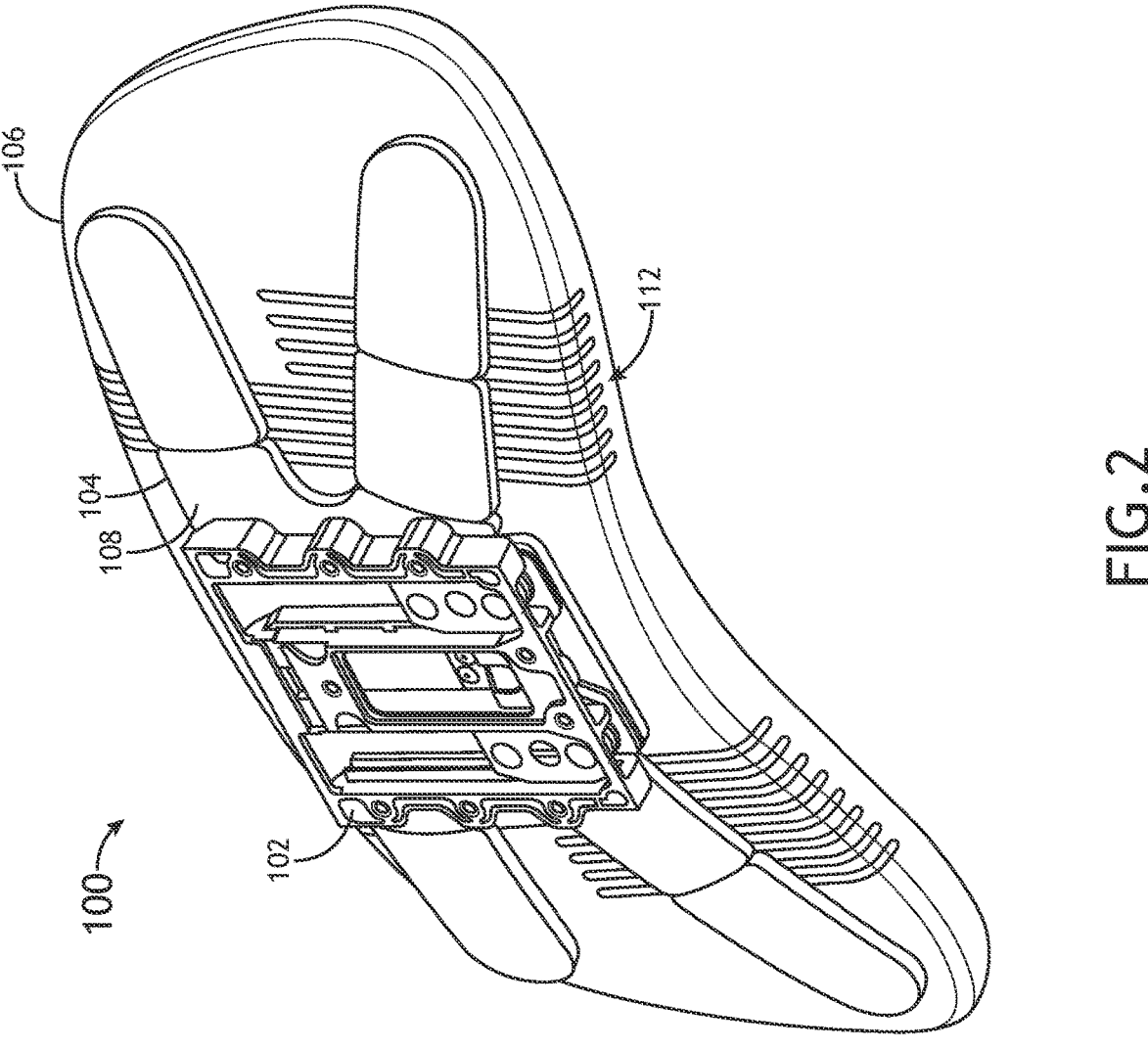
FIG. 2 is a rear perspective view of the headrest assembly shown in FIG. 1.
Figure 3:
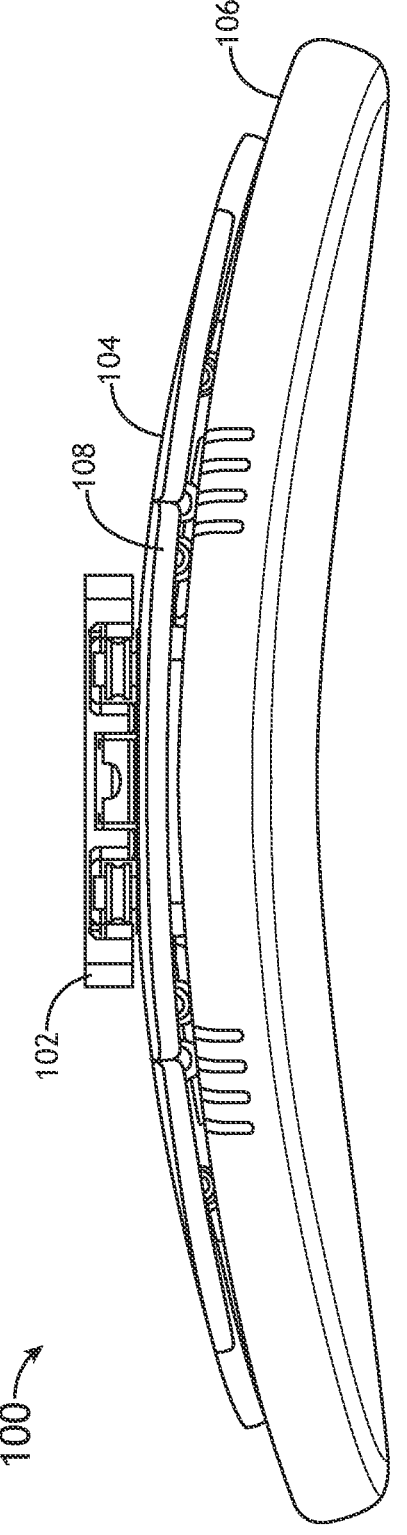
FIG. 3 is a top view of the headrest assembly shown in FIG. 1.
Figure 4:
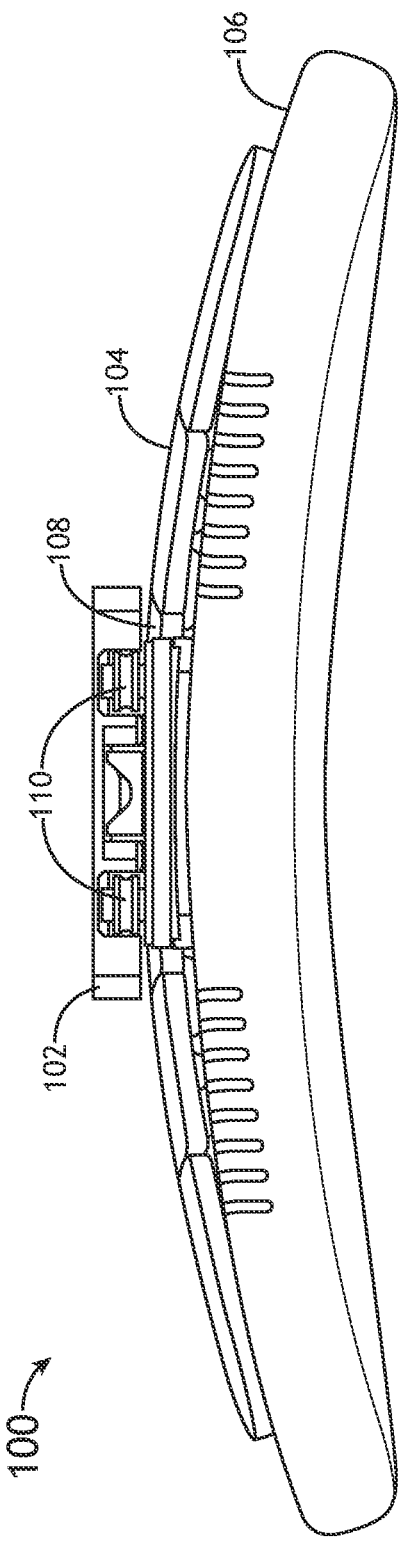
FIG. 4 is a bottom view of the headrest assembly shown in FIG. 1.
Figure 5:
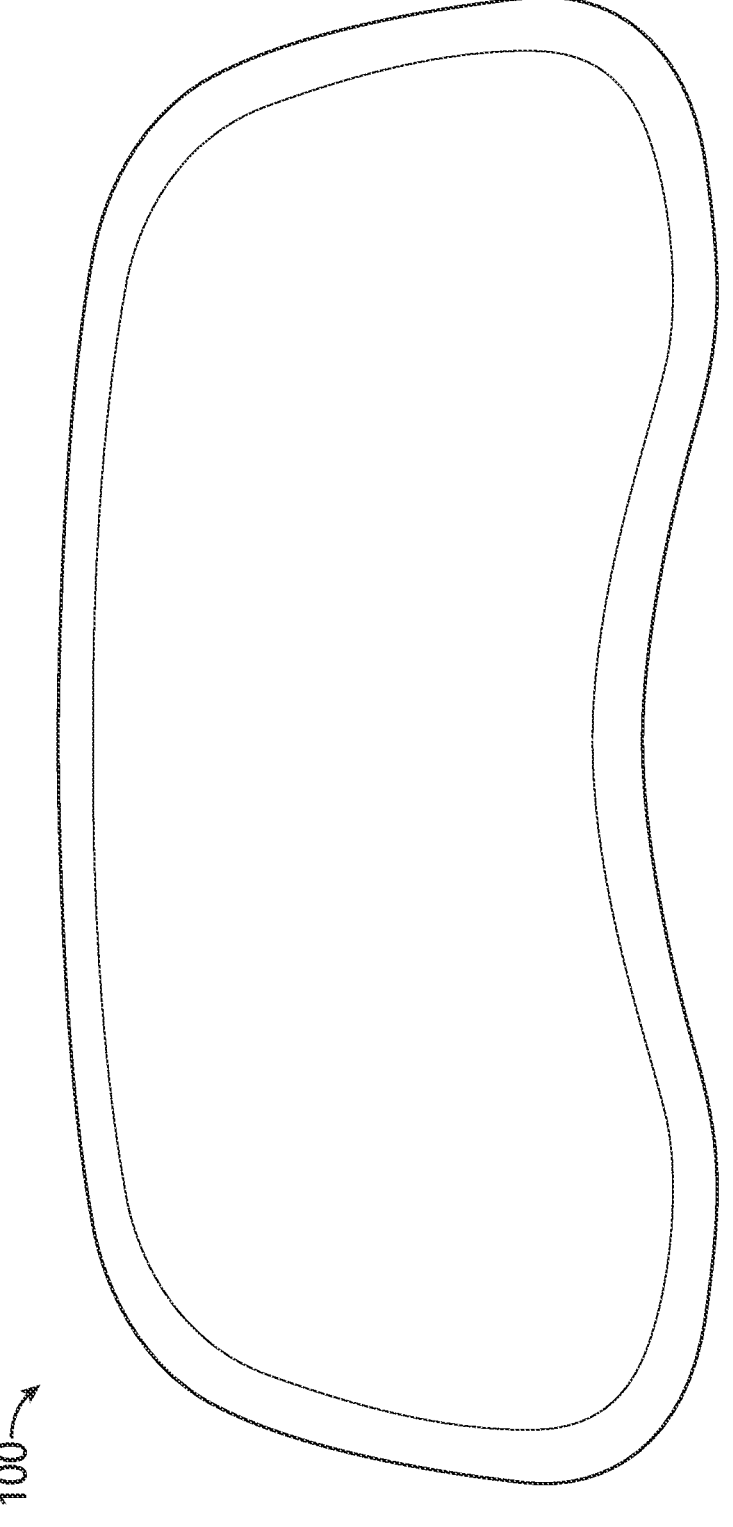
FIG. 5 is a front view of the headrest assembly shown in FIG. 1.
Figure 6:
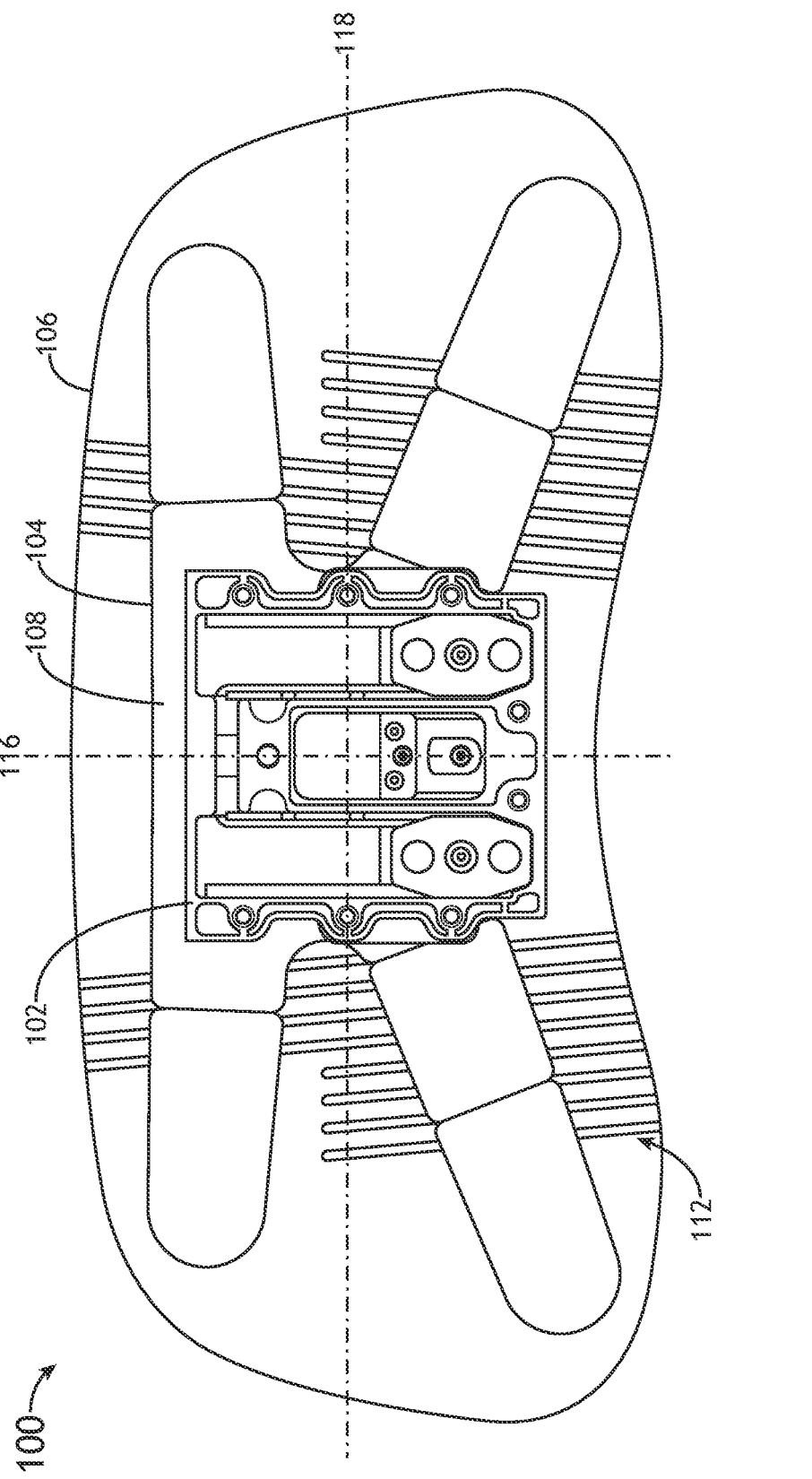
FIG. 6 is a back view of the headrest assembly shown in FIG. 1.
Figure 7:
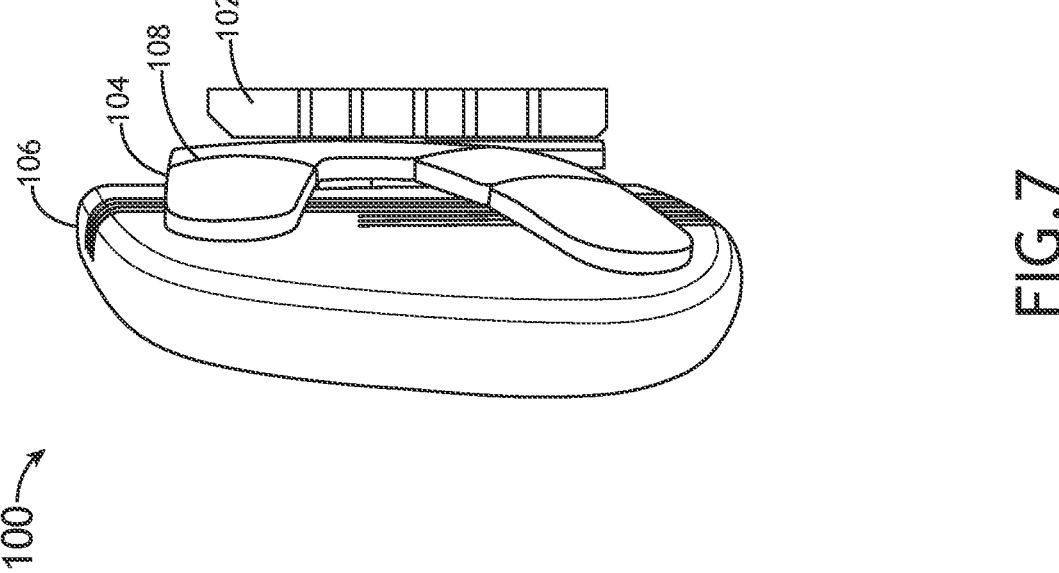
FIG. 7 is a right side view of the headrest assembly shown in FIG. 1.
Figure 8:
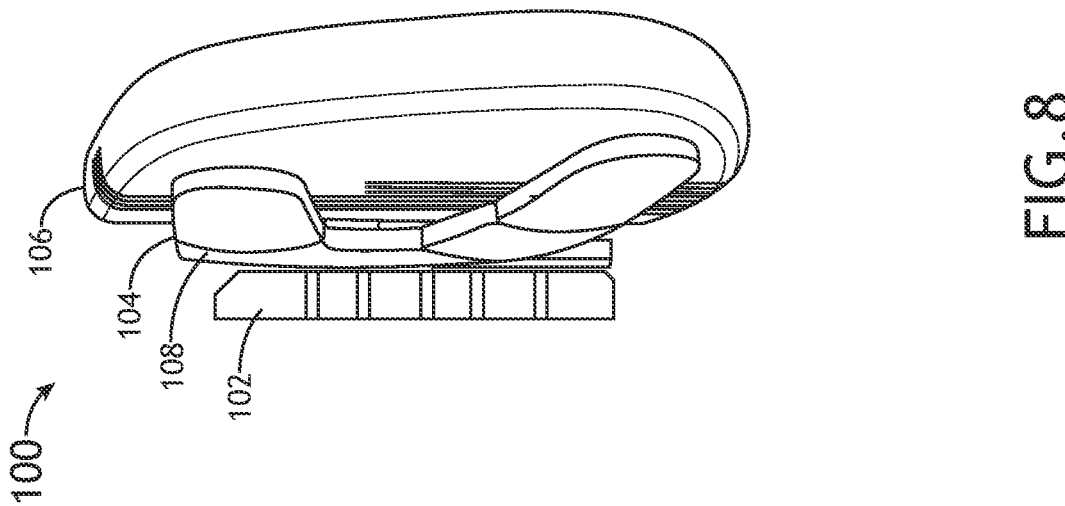
FIG. 8 is a left side view of the headrest assembly shown in FIG. 1.

FIGS. 2 and 6 best illustrate the fixed base 102. The term 'fixed' as used herein means fixed relative to the other components of the headrest assembly, and not necessarily fixed in relation to the seat. In embodiments, the fixed base 102 may be attached to a front of a seat backrest using a plurality of fasteners receivable through the fixed base 102 and into backrest structure. The adjustment subassembly 104 generally includes an adjustable base 108 movably mounted to the fixed base 102. In some embodiments, the adjustable base 108 is slidably coupled to the fixed base 102, for instance configured to slide up and down by way of a slide mechanism or guide rollers 110 as shown in FIG. 4. The adjustable base 108 may be implemented as a mounting plate. As shown in FIG. 3, the adjustable base 108 may have a subtle curvature that induces the same or similar curvature in the cushion subassembly 106.

In embodiments, the cushion subassembly 106 includes a cushion. The cushion may be positioned beneath a cover. The cushion is flexible in order to move with the movements of the adjustment subassembly 104. In embodiments, the cushion subassembly may include relief cuts 112 positioned on the backside thereof proximal to the joints of the components of the adjustment subassembly 104. The relief cuts 112 allow the cushion to bend to conform to the shape of the adjustment subassembly 104.

Figure 9:
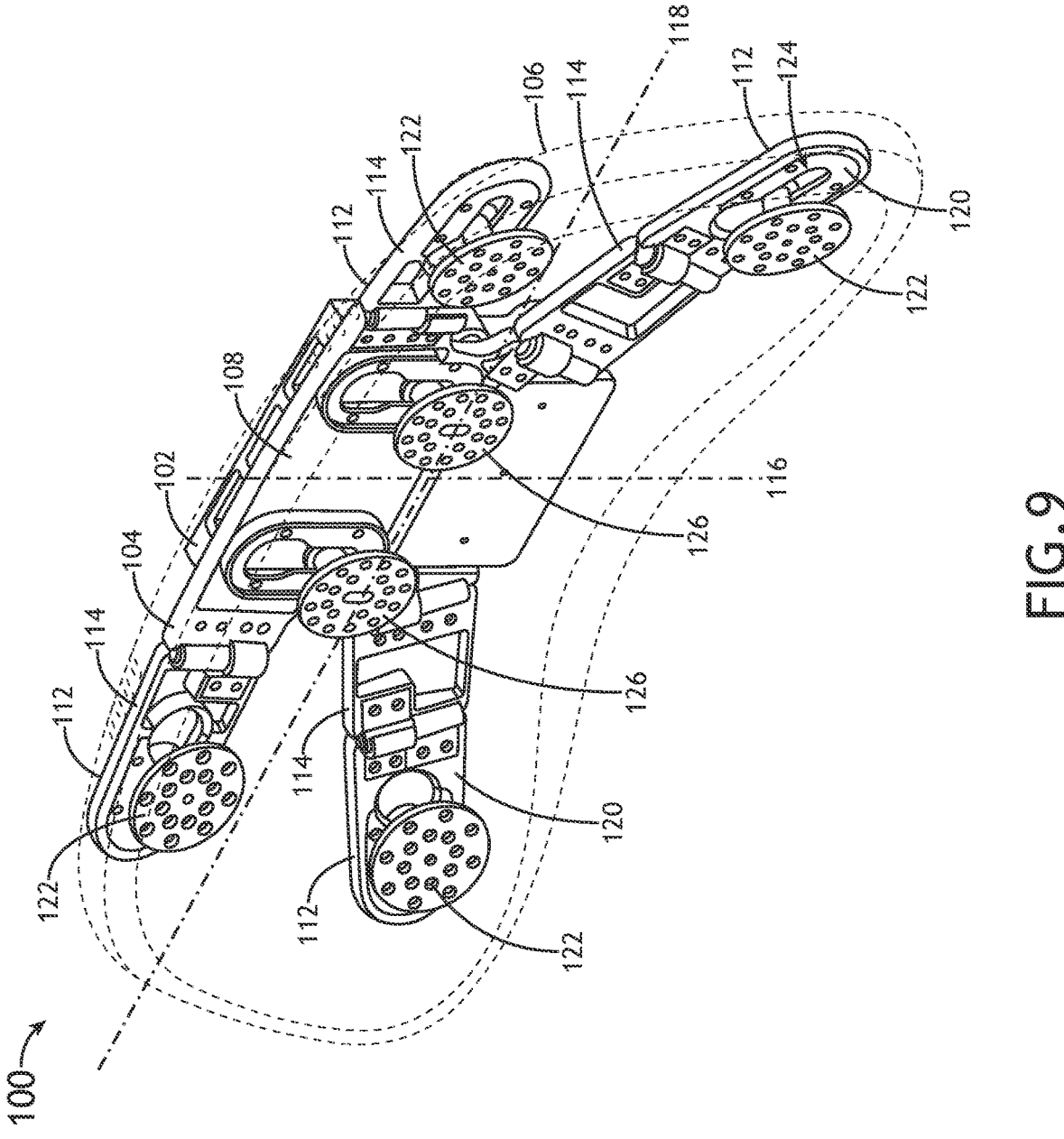
FIG. 9 is a front perspective view of the headrest assembly showing the cushion subassembly in transparency to illustrate the adjustment subassembly.

FIG. 9 illustrates the headrest assembly 100 with the cushion subassembly 106 shown transparent to reveal the adjustment subassembly 104. The adjustment subassembly 104 generally includes the adjustable base 108 and a plurality of lateral arms 112 extending outwardly from the adjustable base 108. Each lateral arm 112 includes a segment 114 rotatably connected to the adjustable base 108. Each segment 114 is independently adjustable by rotating the segment 114, by hand, forward and away from the seat toward a deployed condition of the lateral arm, and backward toward the seat toward a stowed condition of the lateral arm. Friction hinges may be used for the rotational attachments. FIGS. 1-9 show each of the lateral arms 112 fully stowed to provide a substantially flat headrest or a headrest with a minimum curvature.

As best shown in FIGS. 6 and 9, the adjustment subassembly 104 includes four lateral arms 112. Two of the four lateral arms 112 extend laterally from a left side of the adjustable base 108, and two of the four lateral arms 112 extend laterally from a right side of the adjustable base 108. In embodiments, the four lateral arms 112 may be symmetrical about a vertical line 116 drawn through the adjustable base 108, and the four lateral arms 112 may be asymmetrical about a horizontal line 118 drawn through the adjustable base 108.

In embodiments, the four lateral arms 112 may be grouped into an upper pair of lateral arms corresponding to an upper head support portion (e.g., temple region), and a lower pair of lateral arms corresponding to a lower head support portion (e.g., cheek and jaw), wherein the upper pair of lateral arms are aligned along a substantially horizontal axis, and the lower pair of lateral arms are angled relative to the substantially horizontal axis. In embodiments, the lateral arms 112 on each side of the adjustable base 108 may diverge in a direction away from the adjustable base 108, and converge in a direction toward the adjustable base 108. In embodiments, the four lateral arms 112 may be arranged to form an X-shape. In embodiments, each lateral arm 112 is independently adjustable between a stowed position substantially aligned with the curvature of the adjustable base 108, and a deployed position forward of and angled relative to the adjustable base 108.

In embodiments, two of the four lateral arms 112, for instance the lower lateral arms 112 positioned on each side of the adjustable base 108, further include an additional segment 120 rotatably attached to their respective segment 114. The additional segments 120 lengthen and increase the adjustability of the lower lateral arms 112, such that the lower lateral arms 112 have a comparatively longer length than the upper lateral arms 112. This configuration provides for better support of the cheek and jaw of the head when the lateral arms 112 are deployed fully forward. Additional segments may be added to any of the lateral arms 112 to increase the arm length and/or articulating ability of the arms. For example, the length of the individual segments may be shortened and the number of segments increased to decrease the radius of curvature of a fully deployed lateral arm 112.

With continued reference to FIG. 9, the cushion subassembly 106 further includes a plurality of supports 122 configured to slidably couple the cushion subassembly 106 to the adjustment subassembly 104. In some embodiments, the supports 122 may be part of the adjustment assembly 104 and configured for attachment to the cushion subassembly 106. In embodiments, each support 122 includes a first end mounted to or positioned within the cushion, and a second end slidably engaging one of the segments 114. As shown, the upper lateral arms 112 slidably engage the segments 114 rotatably coupled to the adjustable base 108, and the lower lateral arms 112 slidably engage the additional segments 120 coupled to the segments 114. In embodiments, each segment 114, 120 configured to receive a support 122 may include a linear slot 124 defining a motion path for the respective support 122.

In use, the supports 122 travel along their respective slot 124 to accommodate movements in the cushion that would otherwise cause puckering, bunching, folding, etc. with the use of fixed attachment points. For example, with the sliding couplings, when a lateral arm 112 is articulated fully forward the respective support 122 may travel to one end of the slot, and when the lateral arm 112 is return to fully stowed the respective support 122 may travel to the opposing end of the slot. In embodiments, the cushion subassembly 106 may further include additional supports 126 each having one end slidably engaging the adjustable base 108 to accommodate vertical adjustment of the cushion subassembly 106 relative to the adjustment subassembly 104.

The number of lateral arms, arm angles, arm lengths, number of additional segments, segment lengths, slot lengths, and slot angles may be customized to change the headrest adjustability performance.

Figure 10:
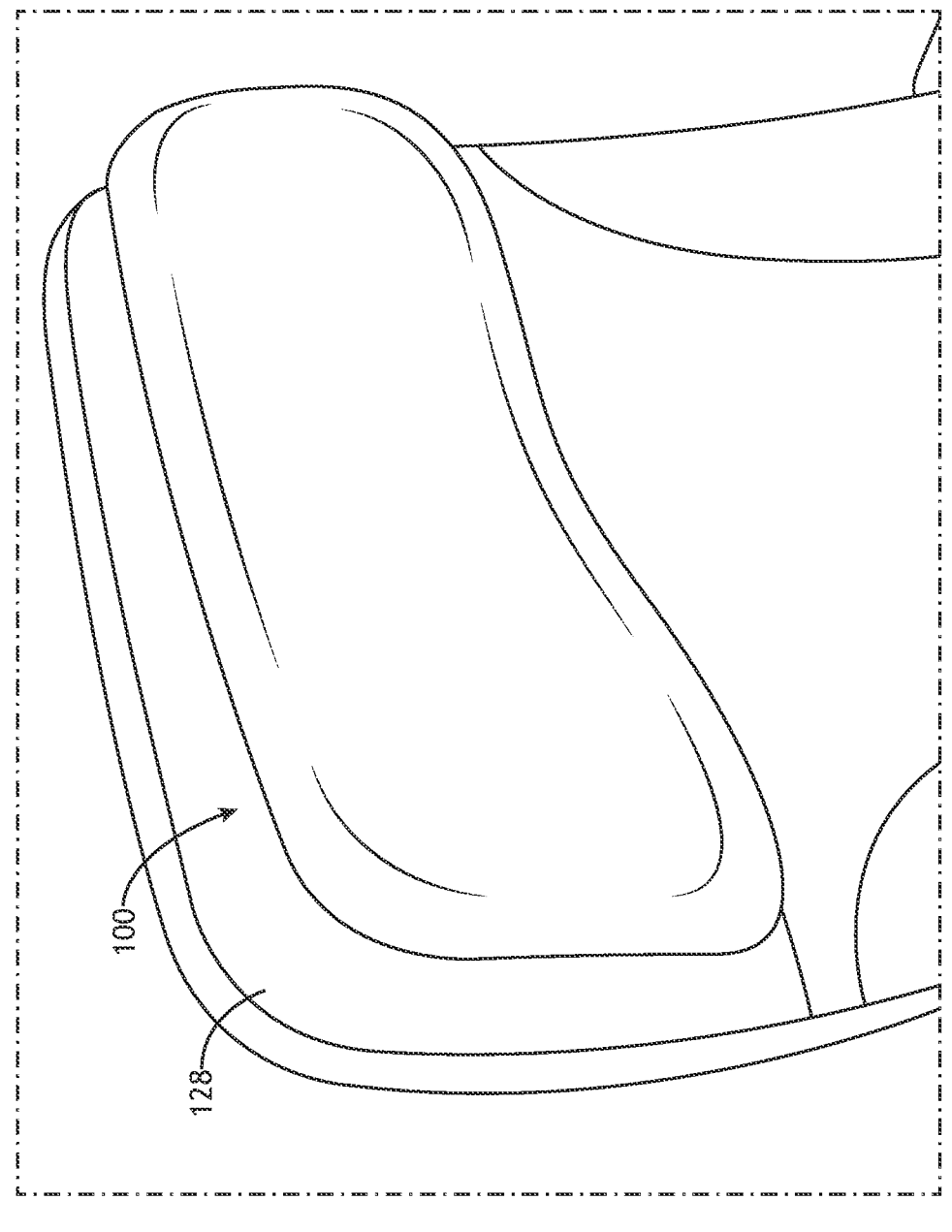
FIG. 10 is a fragmentary front perspective view showing the headrest assembly installed on a passenger seat, in accordance with example embodiments of this disclosure.
Figure 11:
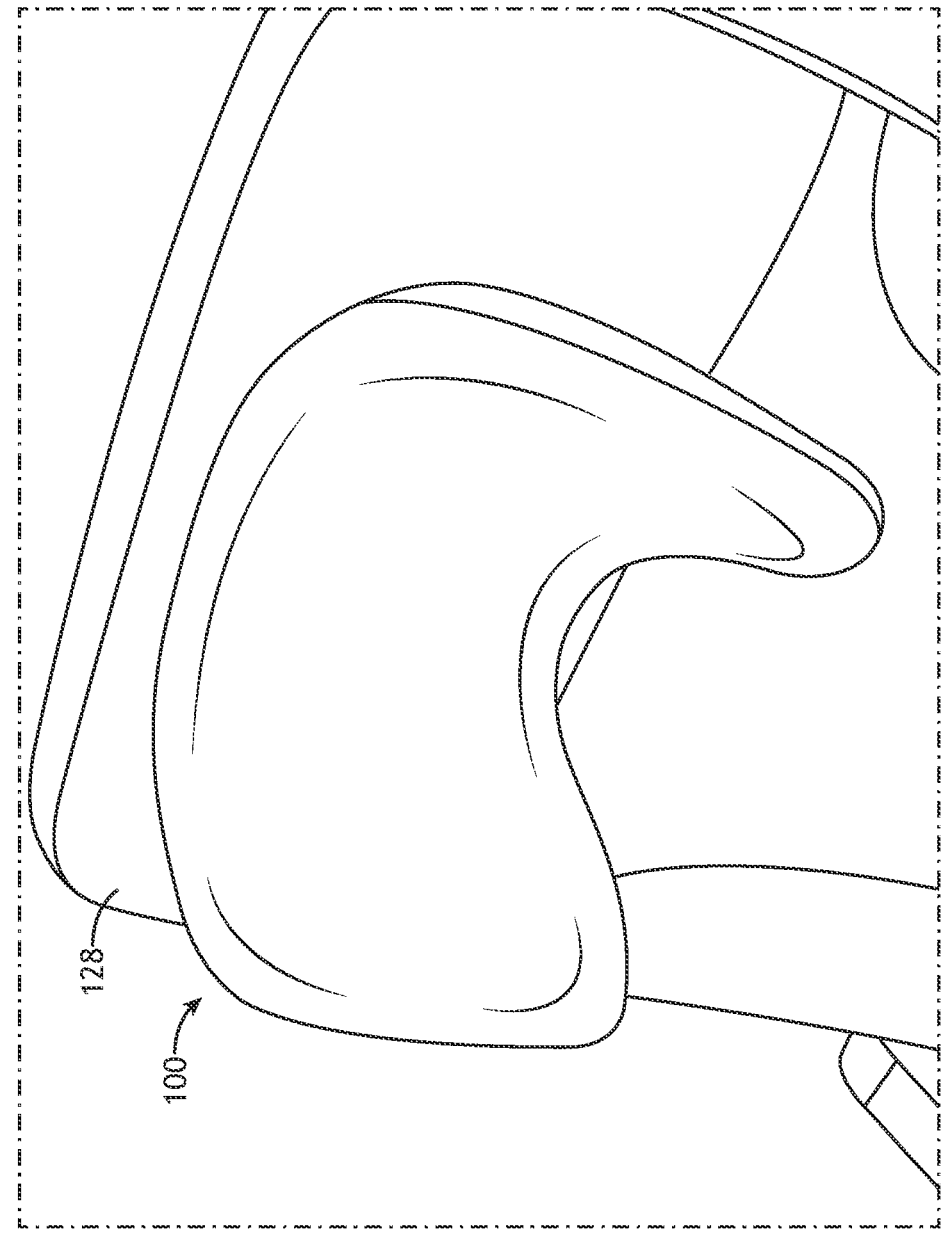
FIG. 11 shows the headrest assembly in a deployed condition.
Figure 12:
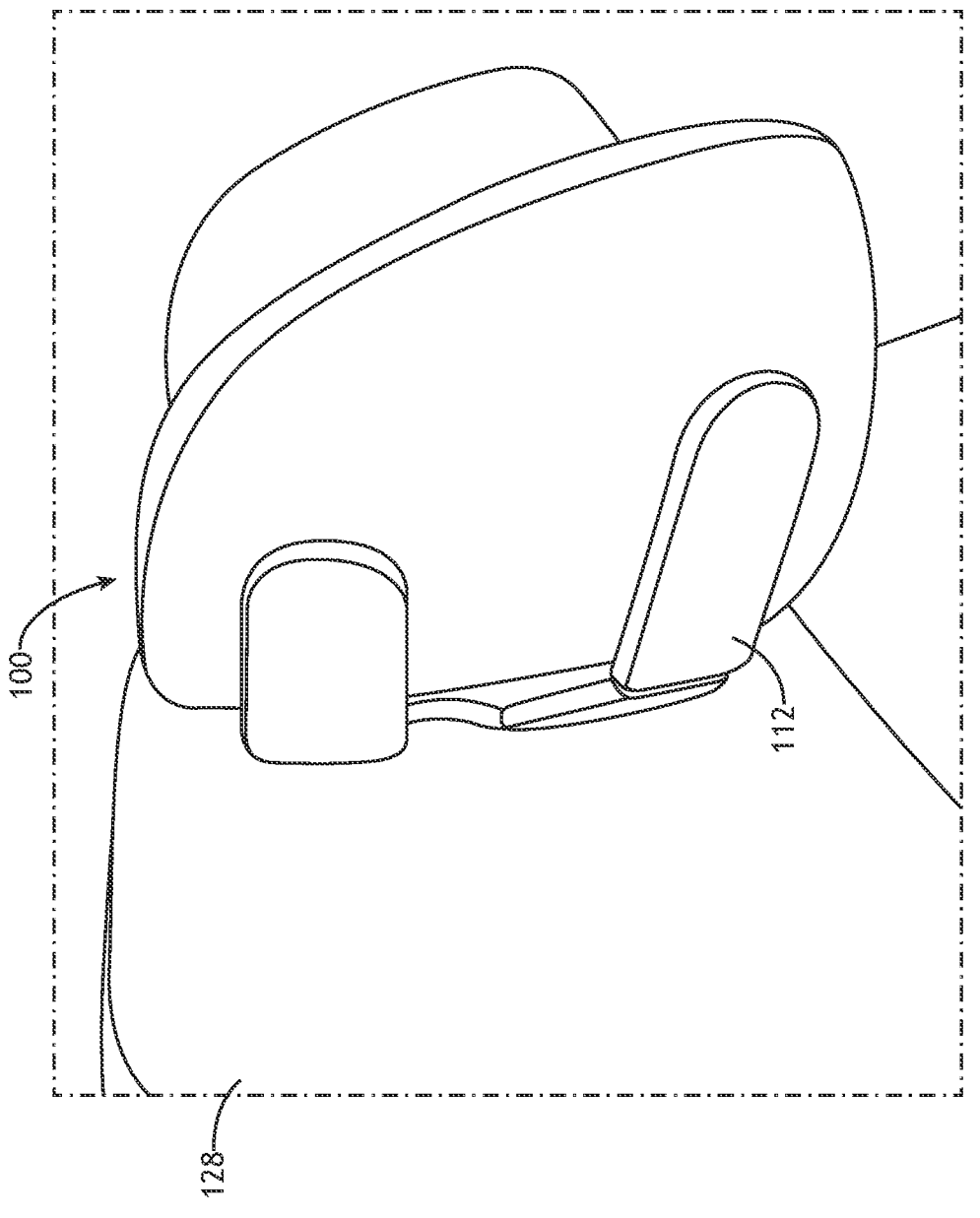
FIG. 12 shows the headrest assembly in a fully deployed condition.

FIG. 10 shows the headrest assembly 100 mounted to the front of a backrest of an aircraft passenger seat 128, and shows the headrest assembly 100 in the fully stowed condition. FIG. 11 shows the mounted headrest assembly 100 in the fully deployed condition forming a cup shape that envelopes the user's head. FIG. 12 shows the mounted headrest assembly 100 from the side and in the fully deployed condition illustrating the longer length of the lower lateral arms 112 providing support for the cheeks and jaw, as well as privacy for the user.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A headrest assembly, comprising:
a fixed base mountable to a seat;
an adjustment subassembly comprising:
an adjustable base movably mounted to the fixed base, the adjustable base configured for up and down adjustment; and
a plurality of lateral arms extending from the adjustable base, each lateral arm including a segment rotatably connected to the adjustable base, and each lateral arm configured for independent forward and back adjustment; and
a cushion subassembly comprising:
a flexible cushion;
a plurality of supports slidably coupling the flexible cushion to the plurality of lateral arms of the adjustment subassembly, each support having one end mounted to the flexible cushion and an opposing end slidably engaging one of the segments; and
a plurality of additional supports slidably coupling the flexible cushion to the adjustable base of the adjustment subassembly, each additional support having one end mounted to the flexible cushion and an opposing end slidably engaging the adjustable base.

2. The headrest assembly according to claim 1, wherein the adjustment subassembly comprises four lateral arms.

3. The headrest assembly according to claim 2, wherein:
two of the four lateral arms extend laterally from a left side of the adjustable base;
two of the four lateral arms extend laterally from a right side of the adjustable base; and
the four lateral arms are symmetrical about a vertical line drawn through the adjustable base.

4. The headrest assembly according to claim 2, wherein:

two of the four lateral arms extend laterally from a left side of the adjustable base;

two of the four lateral arms extend laterally from a right side of the adjustable base; and the four lateral arms are asymmetrical about a horizontal line drawn through the adjustable base.

5. The headrest assembly according to claim 2, wherein:

the four lateral arms are grouped into an upper pair of lateral arms and a lower pair of lateral arms;

the upper pair of lateral arms are aligned along a substantially horizontal axis; and the lower pair of lateral arms are angled relative to the substantially horizontal axis.

6. The headrest assembly according to claim 2, wherein:

two of the four lateral arms, one positioned on each side of the adjustable base, each include an additional segment rotatably attached to their respective segment; and the support associated with each of the two of the four lateral arms slidably engages the additional segment.

7. The headrest assembly according to claim 6, wherein the lateral arms including the additional segment are longer than the lateral arms without the additional segment.

8. The headrest assembly according to claim 2, wherein the four lateral arms are arranged to form an X-shape.

9. The headrest assembly according to claim 1, wherein each of the lateral arms is independently adjustable between a stowed position substantially aligned with a curvature of the adjustable base, and a deployed position forward of and angled relative to the curvature of the adjustable base.

10. The headrest assembly according to claim 1, wherein the cushion subassembly includes relief cuts in the flexible cushion positioned proximal to the rotatable connections of the segments.

11. The headrest assembly according to claim 1, wherein the adjustment subassembly has a larger radius and lower curvature when the plurality of lateral arms are stowed as compared to when the plurality of lateral arms are deployed forward.

12. An aircraft passenger seat, comprising:

a backrest, and a headrest assembly, the headrest assembly comprising:

a fixed base mounted to a front of the backrest;

an adjustment subassembly comprising:

an adjustable base movably mounted to the fixed base, the adjustable base configured for up and down adjustment; and a plurality of lateral arms extending from the adjustable base, each lateral arm including a segment rotatably connected to the adjustable base, and each lateral arm configured for independent forward and back adjustment; and a cushion subassembly comprising:

a flexible cushion;

a plurality of supports slidably coupling the flexible cushion to the plurality of lateral arms of the adjustment subassembly, each support having one end mounted to the flexible cushion and an opposing end slidably engaging one of the segments; and a plurality of additional supports slidably coupling the flexible cushion to the adjustable base of the adjustment subassembly, each additional support having one end mounted to the flexible cushion and an opposing end slidably engaging the adjustable base.

13. The aircraft passenger seat according to claim 12, wherein:

the adjustment subassembly comprises four lateral arms;

two of the four lateral arms extend laterally from a left side of the adjustable base;

two of the four lateral arms extend laterally from a right side of the adjustable base; and the four lateral arms are symmetrical about a vertical line drawn through the adjustable base.

14. The aircraft passenger seat according to claim 13, wherein:

the four lateral arms are grouped into an upper pair of lateral arms and a lower pair of lateral arms;

the upper pair of lateral arms are aligned along a substantially horizontal axis; and the lower pair of lateral arms are angled relative to the substantially horizontal axis.

15. The aircraft passenger seat according to claim 13, wherein:

two of the four lateral arms, one positioned on each side of the adjustable base, each include an additional segment rotatably attached to their respective segment; and the support associated with each of the two of the four lateral arms slidably engages the additional segment.

16. The aircraft passenger seat according to claim 13, wherein the four lateral arms are arranged to form an X-shape.

17. The aircraft passenger seat according to claim 12, wherein:

each of the lateral arms is independently adjustable between a stowed position substantially aligned with a curvature of the adjustable base, and a deployed position forward of and angled relative to the curvature of the adjustable base; and the adjustment subassembly has a larger radius and lower curvature when the plurality of lateral arms are stowed as compared to when the plurality of lateral arms are deployed forward.

* * * * *